US009725885B2

(12) United States Patent
Lee

(10) Patent No.: US 9,725,885 B2
(45) Date of Patent: Aug. 8, 2017

(54) HYDRAULIC CONSTRUCTION MACHINERY

(71) Applicant: VOLVO CONSTRUCTION EQUIPMENT AB, Eskilstuna (SE)

(72) Inventor: Yang-Gu Lee, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 174 days.

(21) Appl. No.: 14/765,767

(22) PCT Filed: Feb. 6, 2013

(86) PCT No.: PCT/KR2013/000952

§ 371 (c)(1),
(2) Date: Aug. 4, 2015

(87) PCT Pub. No.: WO2014/123254

PCT Pub. Date: Aug. 14, 2014

(65) Prior Publication Data

US 2015/0368880 A1 Dec. 24, 2015

(51) Int. Cl.
*F16D 31/02* (2006.01)
*E02F 9/22* (2006.01)
(Continued)

(52) U.S. Cl.
CPC ............ *E02F 9/2292* (2013.01); *E02F 9/123* (2013.01); *E02F 9/2029* (2013.01);
(Continued)

(58) Field of Classification Search
CPC ....... E02F 9/123; E02F 9/2029; E02F 9/2242; F15B 11/17; F15B 11/161
(Continued)

(56) References Cited

U.S. PATENT DOCUMENTS

2008/0053082 A1* 3/2008 Jeon ..................... B62D 11/005 60/421
2010/0031648 A1 2/2010 Choi et al.
2010/0043420 A1 2/2010 Ikeda et al.

FOREIGN PATENT DOCUMENTS

CN 101024967 A 8/2007
CN 101059138 A 10/2007
(Continued)

OTHER PUBLICATIONS

First Office Action issued by the State Intellectual Property Office of the People's Republic of China (SIPO) on Jun. 27, 2016 regarding corresponding China Application No. 201380072267.5 (with English translation) (16 pages).
(Continued)

*Primary Examiner* — Thomas E Lazo
*Assistant Examiner* — Daniel Collins
(74) *Attorney, Agent, or Firm* — Harness, Dickey & Pierce, P.L.C.

(57) ABSTRACT

Disclosed is a hydraulic construction machinery capable of operating a travel apparatus and a swing apparatus, when same are to be operated in combination, by means of working fluids supplied at the maximum discharge flow rate from a plurality of hydraulic pumps. A hydraulic construction machinery according to the present invention comprises: first and second hydraulic pumps; travel and swing motors connected to the first hydraulic pump; a hydraulic actuator connected to the second hydraulic pump; a main control valve comprising a first control valve and a second control valve, the first control valve controlling a working fluid supplied from the first hydraulic pump to the travel and swing motors, and the second control valve controlling the working fluid supplied from the second hydraulic pump to the hydraulic actuator; a first regulating valve, disposed on the most upstream side of a supply channel of the second
(Continued)

hydraulic pump, for switching when the travel and swing motors are operated simultaneously so that the working fluid of the first hydraulic pump is supplied to the travel motor and the working fluid of the second hydraulic pump is supplied to the swing motor; a second regulating valve, disposed on the most downstream side of a supply channel of the second hydraulic pump, for switching when the travel and swing motors are operated simultaneously so as to close the most downstream opening of the supply channel of the second hydraulic pump; and an electronic proportional valve for outputting a control signal, corresponding to a control signal from a controller, to the first and second regulating valves when a manipulation signal, sensing whether the travel and swing motors are manipulated, is entered in the controller.

4 Claims, 3 Drawing Sheets

(51) Int. Cl.
*F15B 11/17* (2006.01)
*E02F 9/12* (2006.01)
*E02F 9/20* (2006.01)

(52) U.S. Cl.
CPC .......... *E02F 9/2242* (2013.01); *E02F 9/2267* (2013.01); *E02F 9/2282* (2013.01); *E02F 9/2296* (2013.01); *F15B 11/17* (2013.01); *F15B 2211/20576* (2013.01); *F15B 2211/30595* (2013.01); *F15B 2211/7058* (2013.01); *F15B 2211/7142* (2013.01)

(58) Field of Classification Search
USPC .................................................... 60/420, 421
See application file for complete search history.

(56) References Cited

FOREIGN PATENT DOCUMENTS

| | | | |
|---|---|---|---|
| CN | 101311020 | A | 11/2008 |
| CN | 101676495 | A | 3/2010 |
| EP | 1895060 | A2 | 3/2008 |
| JP | 2011-002092 | A | 1/2011 |
| KR | 2005-0066041 | A | 6/2005 |
| KR | 2010-0004049 | A | 1/2010 |
| KR | 2010-0044585 | A | 4/2010 |

OTHER PUBLICATIONS

International Search Report (in English and Korean) and Written Opinion of the International Searching Authority (in Korean) for PCT/KR2013/000952, mailed Jul. 1, 2013; ISA/KR.

* cited by examiner

Prior Art

Prior Art

HYDRAULIC CONSTRUCTION MACHINERY

TECHNICAL FIELD

The present invention relates to a hydraulic construction machine. More particularly, the present invention relates to such a hydraulic construction machine in which when a combined operation is performed in which a traveling apparatus and a swing apparatus are operated simultaneously, the traveling apparatus and the swing apparatus can be operated by hydraulic fluid supplied thereto at a maximum discharge flow rate from each of a plurality of hydraulic pump.

BACKGROUND OF THE INVENTION

A hydraulic construction machine in accordance with an embodiment of the prior art as shown in FIG. 1 includes:

a first variable displacement hydraulic pump (hereinafter, referred to as "first hydraulic pump") 1 and a second variable displacement hydraulic pump (hereinafter, referred to as "second hydraulic pump") 2, which are operated by an engine (not shown) or the like;

a traveling motor 3 and a swing motor 4, which are operated by hydraulic fluid supplied from the first hydraulic pump 1;

hydraulic actuators 5, 6 and 7, which are operated by hydraulic fluid supplied from the second hydraulic pump 2; and a main control valve (MCV) 15 including first control valves 9 and 10 that are installed in a supply flow path 8 of the first hydraulic pump 1 and is shifted to control a flow direction of the hydraulic fluid supplied from the first hydraulic pump 1 to the traveling motor 3 and the swing motor 4, and second control valves 12, 13 and 14 that are installed in a supply flow path 11 of the second hydraulic pump 2 and is shifted to control a flow direction of the hydraulic fluid supplied from the second hydraulic pump 2 to the hydraulic actuators 5, 6 and 7.

According to the construction as described above, when a manipulation lever (i.e., RCV lever) is manipulated in order to swing the machine, a spool of the first control valve 10 is shifted to the left or right on the drawing sheet in response to a control signal according to the manipulation of the manipulation lever so that hydraulic fluid discharged from the first hydraulic pump 1 is supplied to the swing motor 4 via the spool of the first control valve 10 along a supply flow path 8. Thus, the machine can be operated to swing separately.

When a travel pedal is manipulated in order to travel the machine, a spool of the first control valve 9 is shifted to the left or right on the drawing sheet in response to a control signal according to the manipulation of the travel pedal so that the hydraulic fluid discharged from the first hydraulic pump 1 is supplied to the traveling motor 3 via the spool of the first control valve 9 along the supply flow path 8. Thus, the machine can be operated to travel separately. As described above, when the machine is caused to swing or travel separately, the hydraulic fluid supplied at a maximum discharge flow rate from the first hydraulic pump 1 can be used In the meantime, when a combined operation is performed in which the traveling apparatus and the swing apparatus are operated simultaneously, a maximum discharge flow rate of the hydraulic fluid is dispensively supplied from the first hydraulic pump 1 to the traveling motor 3 and the swing motor 4. In this case, there is caused a problem in that the work efficiency is deteriorated due to a reduction in the operating speed of the traveling motor 3 and the swing motor 4, and a shock is delivered to an operator who is operating the machine due to a sudden reduction in the traveling speed and the swing speed during the traveling or swing operation of the machine, thus leading to an increase in the operator's fatigue and a decrease in the manipulability.

A hydraulic construction machine in accordance with another embodiment of the prior art as shown in FIG. 2 includes:

a first variable displacement hydraulic pump (hereinafter, referred to as "first hydraulic pump") 1 and a second variable displacement hydraulic pump (hereinafter, referred to as "second hydraulic pump") 2, which are operated by an engine (not shown) or the like;

a traveling motor 3 and a swing motor 4, which are operated by hydraulic fluid supplied from the first hydraulic pump 1;

hydraulic actuators 5, 6 and 7, which are operated by hydraulic fluid supplied from the second hydraulic pump 2;

a main control valve (MCV) 15 including first control valves 9 and 10 that are installed in a supply flow path 8 of the first hydraulic pump 1 and is shifted to control a flow direction of the hydraulic fluid supplied from the first hydraulic pump 1 to the traveling motor 3 and the swing motor 4, and second control valves 12, 13 and 14 that are installed in a supply flow path 11 of the second hydraulic pump 2 and is shifted to control a flow direction of the hydraulic fluid supplied from the second hydraulic pump 2 to the hydraulic actuators 5, 6 and 7;

a selection valve 16 that is installed on the most upstream side of the supply flow path 11 of the second hydraulic pump 2 and is shifted to supply the hydraulic fluid from the first hydraulic pump 1 to the traveling motor 3 and the hydraulic actuators 5, 6 and 7 and to supply the hydraulic fluid from the second hydraulic pump 2 to the swing motor 4 and the hydraulic actuators 5, 6 and 7 in response to a control signal that is applied thereto when the traveling motor 3 and the swing motor 4 are simultaneously operated; and a control valve 17 that is installed on the most downstream side of the supply flow path 11 of the second hydraulic pump 2 and is shifted to close an opening of the most downstream side of the supply flow path 11 of the second hydraulic pump 2 in response to the control signal that is applied thereto when the traveling motor 3 and the swing motor 4 are simultaneously operated.

According to the construction as described above, when the traveling motor 3 and the swing motor 4 are simultaneously operated, the shift of the selection valve 16 supplies the hydraulic fluid from the first hydraulic pump 1 to the traveling motor 3 and the hydraulic actuators 5, 6 and 7, and supplies the hydraulic fluid from the second hydraulic pump 2 to the swing motor 4 and the hydraulic actuators 5, 6 and 7.

In this case, the hydraulic fluid from the first hydraulic pump 1 is supplied to a side whose pressure is relatively low due to a difference in the load pressure between the traveling motor 3 and the hydraulic actuators 5, 6 and 7, and the hydraulic fluid from the first hydraulic pump 1 is supplied to a side whose pressure is relatively low due to a difference in the load pressure between the swing motor 4 and the hydraulic actuators 5, 6 and 7.

For this reason, a flow rate of the hydraulic fluid respectively supplied from the first hydraulic pump 1 and the second hydraulic pump 2 to the traveling motor 3 and the swing motor 4 is variable due to the load pressure generated between the traveling motor 3 and the hydraulic actuators 5, 6 and 7 and the load pressure generated between the swing motor 4 and the hydraulic actuators 5, 6 and 7, thus causing a problem in that the manipulability of the traveling apparatus and the swing apparatus is decreased.

SUMMARY OF THE INVENTION

Accordingly, the present invention has been made to solve the aforementioned problems occurring in the prior art, and it is an object of the present invention to provide a hydraulic construction machine in which when a combined operation is performed in which a traveling apparatus and a swing apparatus are operated simultaneously, a maximum flow rate of the hydraulic fluid discharged from a plurality of hydraulic pumps is used so that a reduction in the operating speed of the traveling apparatus or the swing apparatus can be prevented.

TECHNICAL SOLUTION

To achieve the above object, in accordance with an embodiment of the present invention, there is provided a hydraulic construction machine including:

first and second hydraulic pumps;

a traveling motor and a swing motor, which are operated by hydraulic fluid supplied from the first hydraulic pump;

one or more hydraulic actuators, which are operated by hydraulic fluid supplied from the second hydraulic pump;

a main control valve including first control valves configured to control a flow direction of the hydraulic fluid supplied from the first hydraulic pump to the traveling motor and the swing motor, and second control valves configured to control a flow direction of the hydraulic fluid supplied from the second hydraulic pump to the hydraulic actuators;

a first control valve installed on the most upstream side of a supply flow path of the second hydraulic pump and configured to be shifted to supply the hydraulic fluid from the first hydraulic pump to the traveling motor and to supply the hydraulic fluid from the second hydraulic pump to the swing motor in response to a control signal that is applied thereto when the traveling motor and the swing motor 4 are simultaneously operated;

a second control valve installed on the most downstream side of the supply flow path of the second hydraulic pump and configured to be shifted to close an opening of the most downstream side of the supply flow path of the second hydraulic pump in response to the control signal that is applied thereto when the traveling motor and the swing motor are simultaneously operated;

a controller configured to receive a detected manipulation signal from a sensing means that senses the traveling and swing operations; and an electronic proportional valve configured to output a control signal, which is generated to correspond to an electrical control signal output from the controller, to the first control valve and the second control valve to shift the first control valve and the second control valve when it is determined that a combined operation is performed in which the traveling motor and the swing motor are operated based on the manipulation signal input to the controller from the sensing means.

In the hydraulic construction machine, an inner spool of the second control valve may be shifted in proportion to a level of the control signal output from the electronic proportional valve to cause a part of the hydraulic fluid that is supplied from the second hydraulic pump to the swing motor to be drained to a hydraulic tank to close the opening of the most downstream side of the supply flow path of the second hydraulic pump when the traveling motor 3 and the swing motor are simultaneously operated.

In the hydraulic construction machine, as the sensing means, a pressure sensor may be used which detects whether the control valve for the traveling motor for controlling the hydraulic fluid supplied to the traveling motor and the control valve for the swing motor for controlling the hydraulic fluid supplied to the swing motor 4 are shifted, and outputs the detected manipulation signal to the controller.

In the hydraulic construction machine, the first control valve and the second control valve may be installed inside the main control valve.

Advantageous Effect

The hydraulic construction machine in accordance with an embodiment of the present invention as constructed above has the following advantages.

In a hydraulic system which includes a plurality of hydraulic pumps and is supplied with hydraulic fluid from one hydraulic pump when the traveling and swing operations are performed, a maximum flow rate of the hydraulic fluid discharged from the plural hydraulic pumps is used upon the combined operation in which the traveling and swing operations are performed simultaneously so that a reduction in the operating speed during the combined operation of the traveling apparatus or the swing apparatus can be prevented as compared to during the separate operation of the traveling apparatus or the swing apparatus, thereby improving the work efficiency. In addition, it is prevented that a shock is generated due to a reduction in the speed during the traveling of the machine, thereby improving operability and manipulability.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
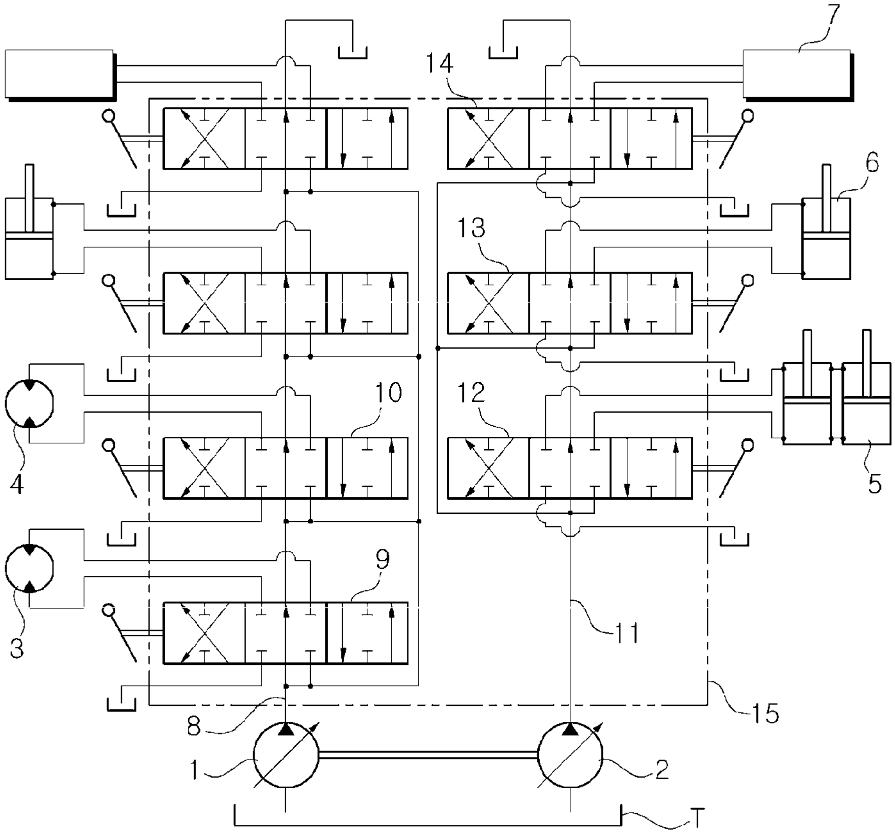
FIG. 1 is a hydraulic circuit diagram of a hydraulic construction machine in accordance with an embodiment of the prior art.
Figure 2:
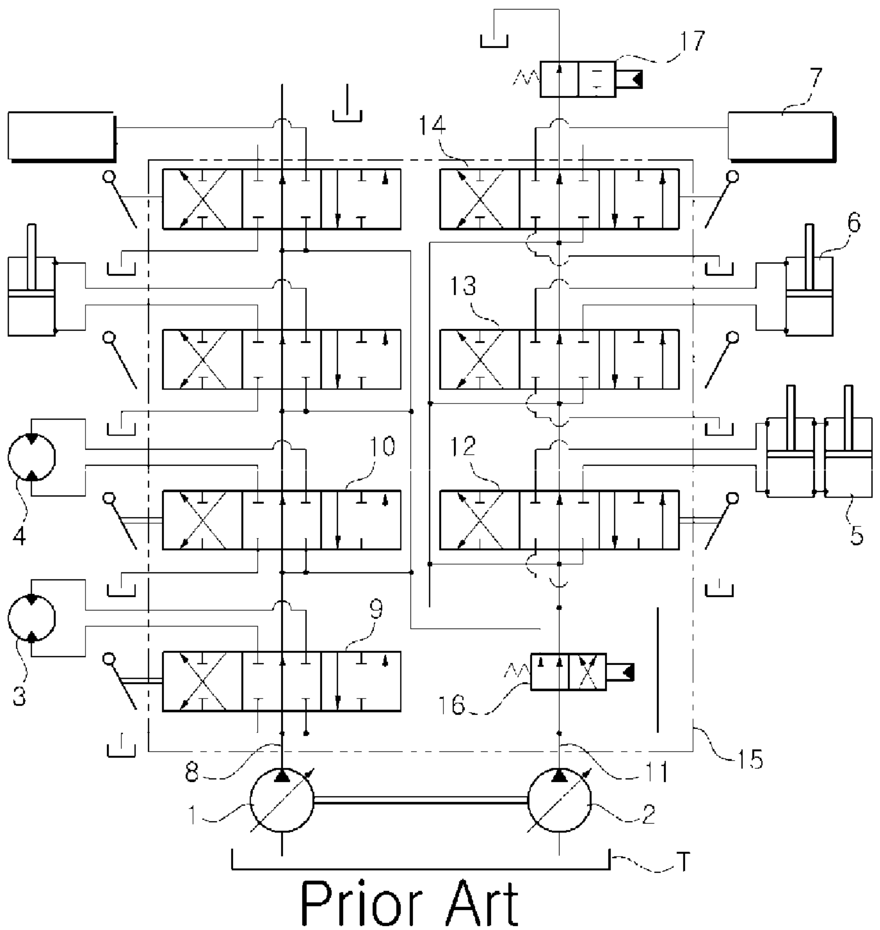
FIG. 2 is a hydraulic circuit diagram of a hydraulic construction machine in accordance with another embodiment of the prior art.

1: first hydraulic pump
3: traveling motor
5, 7: hydraulic actuator
9: first control valve
11: supply flow path
13: second control valve
15: main control valve (MCV)
19: second control valve
21: electronic proportional valve

DETAILED DESCRIPTION OF THE INVENTION

Hereinafter, a hydraulic construction machine in accordance with a preferred embodiment of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

In order to definitely describe the present invention, a portion having no relevant to the description will be omitted, and through the specification, like elements are designated by like reference numerals.

In the specification and the claims, when a portion includes an element, it is meant to include other elements, but not exclude the other elements unless otherwise specifically stated herein.

Figure 3:
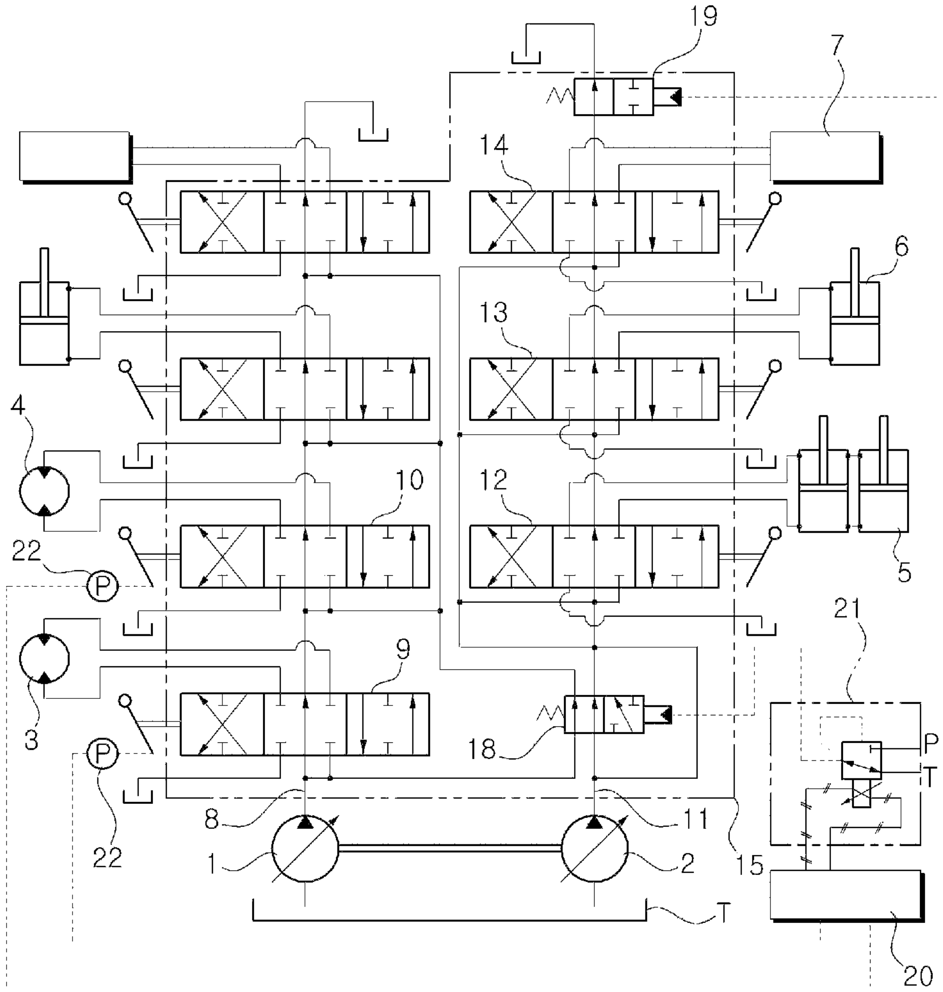
FIG. 3 is a hydraulic circuit diagram of a hydraulic construction machine in accordance with a preferred embodiment of the present invention.

FIG. 3 is a hydraulic circuit diagram of a hydraulic construction machine in accordance with a preferred embodiment of the present invention.

Referring to FIG. 3, a hydraulic construction machine in accordance with an embodiment of the present invention includes:

a first variable displacement hydraulic pump (hereinafter, referred to as "first hydraulic pump") 1 and a second variable displacement hydraulic pump (hereinafter, referred to as "second hydraulic pump") 2, which are operated by an engine (not shown) or the like;

a traveling motor (i.e., a driving motor that drives the wheels of a wheel type excavator) 3 and a swing motor 4, which are operated by hydraulic fluid supplied from the first hydraulic pump 1;

one or more hydraulic actuators 5, 6 and 7, which are operated by hydraulic fluid supplied from the second hydraulic pump 2;

a main control valve (MCV) 15 including first control valves 9 and 10 that controls a flow direction of the hydraulic fluid supplied from the first hydraulic pump 1 to the traveling motor 3 and the swing motor 4, and second control valves 12, 13 and 14 that controls a flow direction of the hydraulic fluid supplied from the second hydraulic pump 2 to the hydraulic actuators 5, 6 and 7;

a first control valve 18 that is installed on the most upstream side of a supply flow path 11 of the second hydraulic pump 2 and is shifted to supply the hydraulic fluid from the first hydraulic pump 1 to the traveling motor 3 and to supply the hydraulic fluid from the second hydraulic pump 2 to the swing motor 4 in response to a control signal that is applied thereto when the traveling motor 3 and the swing motor 4 are simultaneously operated;

a second control valve 19 that is installed on the most downstream side of the supply flow path 11 of the second hydraulic pump 2 and is shifted to close an opening of the most downstream side of the supply flow path of the second hydraulic pump 2 in response to the control signal that is applied thereto when the traveling motor 3 and the swing motor 4 are simultaneously operated;

a controller 10 that receives a detected manipulation signal from a sensing means that senses the traveling and swing operations; and an electronic proportional valve 21 that outputs a control signal, which is generated to correspond to an electrical control signal output from the controller 20, to the first control valve 18 and the second control valve 19 to shift the first control valve 18 and the second control valve 19 when it is determined that a combined operation is performed in which the traveling motor 3 and the swing motor 4 are operated based on the manipulation signal input to the controller 20 from the sensing means.

An inner spool of the second control valve 19 may be shifted in proportion to a level of the control signal output from the electronic proportional valve 21 to cause a part of the hydraulic fluid that is supplied from the second hydraulic pump 2 to the swing motor 4 to be drained to a hydraulic tank T to close the opening of the most downstream side of the supply flow path 11 of the second hydraulic pump 2 when the traveling motor 3 and the swing motor 4 are simultaneously operated.

As the sensing means 22, a pressure sensor may be used which detects whether the control valve 9 for the traveling motor for controlling the hydraulic fluid supplied to the traveling motor 3 and the control valve 10 for the swing motor for controlling the hydraulic fluid supplied to the swing motor 4 are shifted, and outputs the detected manipulation signal to the controller 20.

The first control valve 18 and the second control valve 19 may be installed inside the main control valve 15.

According to the construction as described above, when a spool of the first control valve 10 is shifted in response to a control signal applied thereto by the manipulation of a manipulation lever (i.e., RCV lever) in order to swing the machine, hydraulic fluid discharged from the first hydraulic pump 1 is supplied to the swing motor 4 via the spool of the first control valve 10 along a supply flow path 8.

In the meantime, when a spool of the first control valve 9 is shifted in response to a control signal applied thereto by the manipulation of a travel pedal in order to travel the machine, the hydraulic fluid discharged from the first hydraulic pump 1 is supplied to the traveling motor 3 via the spool of the first control valve 9 along the supply flow path 8. For this reason, the hydraulic fluid supplied at a maximum discharge flow rate from the first hydraulic pump 1 can drive the swing motor 4 or the traveling motor 3 during a separate swing or traveling of the machine.

Meanwhile, in the case of a combined operation in which the traveling and swing operations are simultaneously performed, the sensing means 22 detects whether the control valve 9 for the traveling motor and the control valve 10 for the swing motor are shifted, and outputs a detected manipulation signal to the controller 20. The controller 20 outputs an electrical control signal to the electronic proportional valve 21 if it is determined that the combine operation is performed in which the traveling motor and the swing motor are simultaneously operated based on the detected manipulation signal input thereto from the sensing means 22.

Thus, the electronic proportional valve 21 generates a secondary control signal to correspond to the electrical control signal input thereto from the controller 20. The generated secondary control signal is outputted to the first control valve 18 and the second control valve 19 to shift the first control valve 18 and the second control valve 19. In other words, when a spool of the first control valve 18 installed on the most upstream side of the supply flow path 11 of the second hydraulic pump 2 is shifted to the left on the drawing sheet, the hydraulic fluid discharged from the first hydraulic pump 1 is supplied to only the traveling motor 3 via the first control valve 9 for the traveling motor along the supply flow path 8, and the hydraulic fluid discharged from the second hydraulic pump 2 is supplied to only the swing motor 4 via and the first control valve 18 and the first control valve 10 for the swing motor along the supply flow path 11.

Thus, in the case of a combined operation in which the traveling and swing operations are simultaneously performed, the hydraulic fluid supplied at a maximum discharge flow rate from the first hydraulic pump 1 is used to drive the traveling motor 3, and the hydraulic fluid supplied at a maximum discharge flow rate from the second hydraulic pump 2 is used to drive the swing motor 4.

In the meantime, in the case of the combined operation in which the traveling and swing operations are simultaneously performed, a spool of the second control valve 19 stalled on the most downstream side of the supply flow path 11 of the second hydraulic pump 2 is shifted to the left on the drawing sheet in response to the control signal applied thereto from the electronic proportional valve 21.

For this reason, the hydraulic fluid discharged from the second hydraulic pump 2 to the swing motor 4 is supplied to the swing motor 4. Then, the inner spool of the second control valve 19 is shifted in proportion to a level of the control signal output from the electronic proportional valve 21. In other words, at an initial stage in which the spool of the second control valve 19 starts to be shifted in response to the control signal input thereto from the electronic proportional valve 21, the opening of the most downstream side of the supply flow path 11 of the second hydraulic pump 2 is not completely closed. As a result, the hydraulic fluid from the second hydraulic pump 2 is supplied to the swing motor 4 to drive the swing motor 4, and simultaneously a part of the hydraulic fluid supplied from the second hydraulic pump 2 to the swing motor 4 can be drained to a hydraulic tank T.

When the spool of the second control valve 19 completely closes the opening of the most downstream side of the supply flow path 11 of the second hydraulic pump 2 in response to the control signal input thereto from the electronic proportional valve 21, a maximum flow rate of hydraulic fluid discharged from the second hydraulic pump 2 can be supplied to the swing motor 4. For this reason, when the maximum flow rate of hydraulic fluid discharged from the second hydraulic pump 2 is supplied to the swing motor 4, it is possible to reduce a shock generated in a hydraulic system depending on a change in the swing direction due to a sudden increase in the flow rate of the hydraulic fluid.

As described above, in the case of the combined operation in which the traveling and swing operations are simultaneously performed, a maximum flow rate of the hydraulic fluid discharged from the first hydraulic pump 1 is supplied to only the traveling motor 3, and a maximum flow rate of the hydraulic fluid discharged from the second hydraulic pump 2 is supplied to only the swing motor 4 so that it is possible to secure the same operating speed as that in the case where the traveling or swing operation is performed separately.

INDUSTRIAL APPLICABILITY

In accordance with the hydraulic construction machine of the present invention as constructed above, when the combined operation is performed in which the traveling apparatus and the swing apparatus are operated simultaneously, traveling apparatus and the swing apparatus can be operated by the hydraulic fluid supplied thereto at a maximum discharge flow rate from a plurality of hydraulic pumps.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A hydraulic construction machine comprising:

first and second hydraulic pumps;

a traveling motor and a swing motor, which are operated by hydraulic fluid supplied from the first hydraulic pump;

one or more hydraulic actuators, which are operated by hydraulic fluid supplied from the second hydraulic pump;

a main control valve including first control valves configured to control a flow direction of the hydraulic fluid supplied from the first hydraulic pump to the traveling motor 3 and the swing motor, and second control valves configured to control a flow direction of the hydraulic fluid supplied from the second hydraulic pump to the hydraulic actuators;

a first control valve installed on the most upstream side of a supply flow path of the second hydraulic pump and configured to be shifted to supply the hydraulic fluid from the first hydraulic pump to the traveling motor and to supply the hydraulic fluid from the second hydraulic pump to the swing motor in response to a control signal that is applied thereto when the traveling motor and the swing motor are simultaneously operated;

a second control valve installed on the most downstream side of the supply flow path of the second hydraulic pump and configured to be shifted to close an opening of the most downstream side of the supply flow path of the second hydraulic pump in response to the control signal that is applied thereto when the traveling motor 3 and the swing motor are simultaneously operated;

a controller configured to receive a detected manipulation signal from a sensing means that senses the traveling and swing operations; and an electronic proportional valve configured to output a control signal, which is generated to correspond to an electrical control signal output from the controller, to the first control valve and the second control valve to shift the first control valve and the second control valve when it is determined that a combined operation is performed in which the traveling motor and the swing motor are operated based on the manipulation signal input to the controller from the sensing means.

2. The hydraulic construction machine according to claim 1, wherein an inner spool of the second control valve is shifted in proportion to a level of the control signal output from the electronic proportional valve to cause a part of the hydraulic fluid that is supplied from the second hydraulic pump to the swing motor to be drained to a hydraulic tank T to close the opening of the most downstream side of the supply flow path of the second hydraulic pump when the traveling motor and the swing motor are simultaneously operated.

3. The hydraulic construction machine according to claim 1, wherein as the sensing means, a pressure sensor is used which detects whether the control valve for the traveling motor for controlling the hydraulic fluid supplied to the traveling motor and the control valve for the swing motor for controlling the hydraulic fluid supplied to the swing motor are shifted, and outputs the detected manipulation signal to the controller.

4. The hydraulic control machine according to claim 1, wherein the first control valve and the second control valve are installed inside the main control valve.

* * * * *